US012348426B2

(12) United States Patent
True et al.

(10) Patent No.: US 12,348,426 B2
(45) Date of Patent: Jul. 1, 2025

(54) SYSTEMS AND METHODS FOR COMMUNICATING WITH A VEHICLE UTILIZING A VIRTUALIZED AND LOGICAL COMMUNICATIONS NETWORK

(71) Applicant: Honeywell International Inc., Charlotte, NC (US)

(72) Inventors: Willard R. True, Kirkland, WA (US); Donald C. Kauffman, Laurel, MD (US); Michael L. Olive, Cockeysville, MD (US)

(73) Assignee: Honeywell International Inc., Charlotte, NC (US)

( * ) Notice: Subject to any disclaimer, the term of this patent is extended or adjusted under 35 U.S.C. 154(b) by 633 days.

(21) Appl. No.: 17/567,650

(22) Filed: Jan. 3, 2022

(65) Prior Publication Data

US 2023/0216800 A1 Jul. 6, 2023

(51) Int. Cl.
*H04L 47/2491* (2022.01)
*H04L 67/12* (2022.01)

(52) U.S. Cl.
CPC .......... *H04L 47/2491* (2013.01); *H04L 67/12* (2013.01)

(58) Field of Classification Search
CPC ...................................................... H04L 67/12
See application file for complete search history.

(56) References Cited

U.S. PATENT DOCUMENTS

| 2020/0250993 | A1 | 8/2020 | Li et al. | |
| 2022/0046528 | A1* | 2/2022 | Yang | H04B 7/088 |
| 2022/0386147 | A1* | 12/2022 | Majjiga | G08G 5/0026 |
| 2023/0198607 | A1* | 6/2023 | Yang | H04L 1/0015 |
| | | | | 370/316 |
| 2023/0239724 | A1* | 7/2023 | Pateromichelakis | H04W 4/023 |
| | | | | 370/230 |
| 2023/0284078 | A1* | 9/2023 | Pateromichelakis | |
| | | | | H04W 56/0015 |
| | | | | 370/235 |

FOREIGN PATENT DOCUMENTS

| WO | 2020033905 A1 | 2/2020 |
| WO | 2020163760 A2 | 8/2020 |
| WO | 2021041214 A1 | 3/2021 |

OTHER PUBLICATIONS

3GPP TR 38.913 V16.0.0 (Jul. 2020), 3rd Generation Partnership Project; Technical Specification Group Radio Access Network; 5G; Study on scenarios and requirements for next generation access technologies (Release 16) (Year: 2020).*
Foukas et al. "Network Slicing in 5G: Survey and Challenges", IEEE Communications Magazine, May 2017, pp. 94 through 100, vol. 55, No. 5, https://www.pure.ed.ac.uk/ws/files/32883461/network_slicing_5g_final_version_1.pdf.
GSMA, "An Introduction to Network Slicing", 2017, pp. 1 through 20, https://www.gsma.com/futurenetworks/wp-content/uploads/2017/11/GSMA-An-Introduction-to-Network-Slicing.pdf.

(Continued)

*Primary Examiner* — Gary Mui
*Assistant Examiner* — Yewon Kim
(74) *Attorney, Agent, or Firm* — Fogg & Powers LLC (57) ABSTRACT

Techniques are disclosed of forming communications links with a vehicle, where each of at least two communication links are formed through different virtual and logical communications networks operated on a physical communications network.

17 Claims, 4 Drawing Sheets

(56) References Cited

OTHER PUBLICATIONS

Jamal et al., "UAV Command and Control, Navigation and Surveillance: A Review of Potential 5G and Satellite Systems", 2019 IEEE Aerospace Conference, 2019, pp. 1 through 10, Big Sky, MT, USA.

Koumaras et al., "5G-Enabled UAVs with Command and Control Software Component at the Edge for Supporting Energy Efficient Opportunistic Networks", Energies, 14, Mar. 8, 2021, pp. 1 through 17, MDPI, https://www.mdpi.com/journal/energies.

RTCA, "Minimum Aviation System Performance Standards for C2 Link Systems Supporting Operations of Unmanned Aircraft Systems in U.S. Airspace", RTCA DO-377A, Sep. 16, 21, pp. 1 through 738, Published: US.

Techplayon, "5G RAN and 5GC Network Slice Signaling", Retrieved from https://www.techplayon.com/5g-ran-and-5gc-network-slice-signaling/, Apr. 14, 2021, pp. 1 through 9.

* cited by examiner

SYSTEMS AND METHODS FOR COMMUNICATING WITH A VEHICLE UTILIZING A VIRTUALIZED AND LOGICAL COMMUNICATIONS NETWORK

BACKGROUND

Due to terrestrial congestion, aerial vehicles are expected to be more numerously used to transport persons and goods in urban and suburban environments, or even other environments. Each aerial vehicle may be piloted by a human being on the aerial vehicle, may be remotely piloted, or may be autonomously piloted. In any case, there is a need to effectively convey information to and from each aerial vehicle.

SUMMARY

A method for communicating with a vehicle comprising command and control electronic circuitry and at least one other system, the method comprising: communicating data of a first type of data in a first communications protocol between the command and control electronic circuitry, configured to at least one of: control navigation of the vehicle, control at least one state variable of the vehicle, provide data about status of at least one component of the vehicle, and receive data for controlling the at least one component of the vehicle, and a first virtual and logical communications network operated on a physical communications network, wherein the physical communications network comprises a physical cellular communications network and/or a physical satellite communications network; and communicating data of a second type of data in a second communications protocol between the at least one other system of the vehicle, and a second virtual and logical communications network operated on the physical communications network or on the physical communications network.

A communications network, comprising: a first virtual and logical communications network configured to communicate data of a first type of data in a first communications protocol with command and control electronic circuitry, of a vehicle, configured to at least one of: control navigation of the vehicle, control at least one state variable of the vehicle, provide data about status of at least one component of the vehicle, and receive data for controlling the at least one component of the vehicle; a physical communications network or a second virtual and logical communications network configured to communicate data of a second type of data in a second communications protocol with at least one other system of the vehicle, wherein the physical communications network comprises a physical cellular communications network and/or a physical satellite communications network; and wherein each of the first virtual and logical communications network and the second virtual and logical communications network is operated on the physical communications network.

A system configured to be mounted in a vehicle comprising (a) command and control electronic circuitry, configured to at least one of: control travel of the vehicle and provide data about status of at least one component of the vehicle, and (b) at least one other system, the system comprises: front end circuitry configured to translate a frequency band of first and second data between a higher band and a lower band; backend circuitry, communicatively coupled to the front end circuitry, configured to at least one of demodulate and decode data received from the front end circuitry, and at least one of modulate and code data provided to the front end circuitry; wherein the backend circuitry is configured to be communicatively coupled to the command and control electronic circuitry and the at least one other system of the vehicle; and wherein the front end circuitry and the backend circuitry are further configured to communicate data of a first data type in a first communications protocol between the command and control electronic circuitry and a first virtual and logical communications network operated on a physical communications network wherein the physical communications network comprises a physical cellular communications network and/or a physical satellite communications network; wherein the front end circuitry and the backend circuitry are further configured to communicate data of a second data type in a second communications protocol between the at least one other system, and a second virtual and logical operated on the physical communications network or the physical communications network.

DRAWINGS

Embodiments of the present invention can be more easily understood and further advantages and uses thereof more readily apparent, when considered in view of the description of the preferred embodiments and the following figures in which.

In accordance with common practice, the various described features are not drawn to scale but are drawn to emphasize specific features relevant to the exemplary embodiments. Reference characters denote like elements throughout figures and text.

DETAILED DESCRIPTION

In the following detailed description, reference is made to the accompanying drawings that form a part hereof, and in which is shown by way of specific illustrative embodiments in which the invention may be practiced. These embodiments are described in sufficient detail to enable those skilled in the art to practice the invention, and it is to be understood that other embodiments may be utilized, and that logical, mechanical and electrical changes may be made without departing from the scope of the present invention. The following detailed description is, therefore, not to be taken in a limiting sense. Further embodiments of the invention may be used with any type of vehicle including without limitation a terrestrial vehicle, a waterborne vehicle, and a submersible vehicle; however, for pedagogical purposes, a vehicle is illustrated herein as an aerial vehicle.

In embodiments of the invention, at least two communication links are formed with the aerial vehicle. The aerial vehicle may be manned by a crew, e.g., pilot(s), or may be unmanned and remotely piloted.

A first communications link is formed between a first subsystem of an aerial vehicle and a first entity, e.g., a first system, at a first location remote from the aerial vehicle. The first subsystem sends data to and receives data from the first entity in a first communications protocol through a first virtual and logical communications network of a physical communications network. A second communications system is formed between a second subsystem of the aerial vehicle and a second entity, e.g., a second system, at the first location or a second location remote from the aerial vehicle. The second subsystem sends data to and receives data from the second entity in a second communications protocol through a second virtual and logical communications network of the physical communications network or through the physical communications network. Optionally, the physical communications network is a public network; a public network is available to the general public.

The first communications protocol is different from the second communications protocol. Communications protocol means a structure and rules for exchange of data. Optionally, the first communications protocol comprises additional data indicating a particular logical and virtual network. Optionally the first communications protocol comprises optional additional data uniquely associated with the particular logical and virtual network and/or optional additional data about or related to (a) command and control of the aerial vehicle including data about aerial vehicle navigation (e.g., aerial vehicle path of travel, aerial vehicle location, and/or waypoint(s)) and/or aerial vehicle state variable(s) (e.g., speed, heading, and/or attitude) (b) status monitoring and/or control of the aerial vehicle propulsion system(s), and/or (c) status monitoring and/or control of other aerial vehicle component(s).

Each virtual and logical communications network has a different quality of service in comparison to the physical communications network when the physical communications network uses its' default quality of service. Each virtual and logical communications network may have a different quality of service in comparison to other virtual and logical communications network(s) operated on the physical communications network. A virtual and logical communications network is operated on a physical communications network and is a private network available to relatively few user(s), e.g., aerial vehicle(s) and optionally certain entities requiring access to the private network.

Optionally, the first virtual and logical communications network (e.g., the first virtual and logical communications network) has at least one of lower latency, lower packet loss, higher certainty of data integrity, higher continuity, higher availability, and/or higher level of confidentiality than the physical communications network when the physical communications network uses its' default quality of service or than the second virtual and logical communications network. Optionally, the physical communications network 104 has no guaranteed quality of service.

Quality of service means a requirement for at least one of the following parameters: latency, packet loss, certainty of data integrity, continuity, availability, and/or level of confidentiality. Availability means a degree to which a communications network, e.g., a virtual and logical network, is operational and accessible when required for use, e.g., by an aerial vehicle or component therein. Continuity means:

$$\frac{\text{Number of Transactions Completed within } TET}{\text{Number of All Initiated Transactions}},$$

where transaction expiration time (TET) means a maximum time, defined by an operational requirement, to complete a transaction provided that a corresponding communications link over which the transaction is sent was available at commencement of the transaction; optionally, TET may be selected to be between 1 and 3 seconds and may be dependent upon the phase of travel, e.g., take-off, enroute flight, and landing, of the aerial vehicle 102. Transaction means sending data from a transmitter through a communications link and receiving all of the sent data at a receiver. Data integrity means that data, e.g., a message, has not been tampered with or altered and is provided by a user authorized to convey the data. Confidentiality means protecting data from disclosure to unauthorized recipient(s). Thus, optionally, the first virtual and logical communications network can be used to more reliably and/or more securely convey remotely provided instructions to control attitude and/or heading control mechanism(s)[1] and propulsion system(s)[2] of an aerial vehicle and/or data, e.g., way point(s) and/or location of items[3] which may cause the aerial vehicle to deviate from its path of travel. Optionally, additionally or alternatively, the first virtual and logical communications network can be used to convey information with at least one of lower latency, lower packet loss, higher certainty of data integrity, higher continuity, higher availability, and higher level of confidentiality between a remote pilot[4] and air traffic control than if the same information were conveyed over the physical communications network and/or over another virtual and logical communications network operated on the physical communications network. Latency means a difference between when a data is sent by one entity and received by another entity, e.g., sent by the remote vehicle control entity and received by the aerial vehicle 102 or the traffic control entity 103 or vice versa.

[1] E.g., to control position of each control surface and/or nose wheel steering angle(s).
[2] E.g., to control power provided by engine(s).
[3] E.g., location(s) of weather and/or other aerial vehicle(s), and/or changes to location of controlled airspace.
[4] A remote pilot means a pilot that is not physically in or on the aerial vehicle, e.g., located at a terrestrial location, in another aerial vehicle, or in any other location.

Figure 1A:
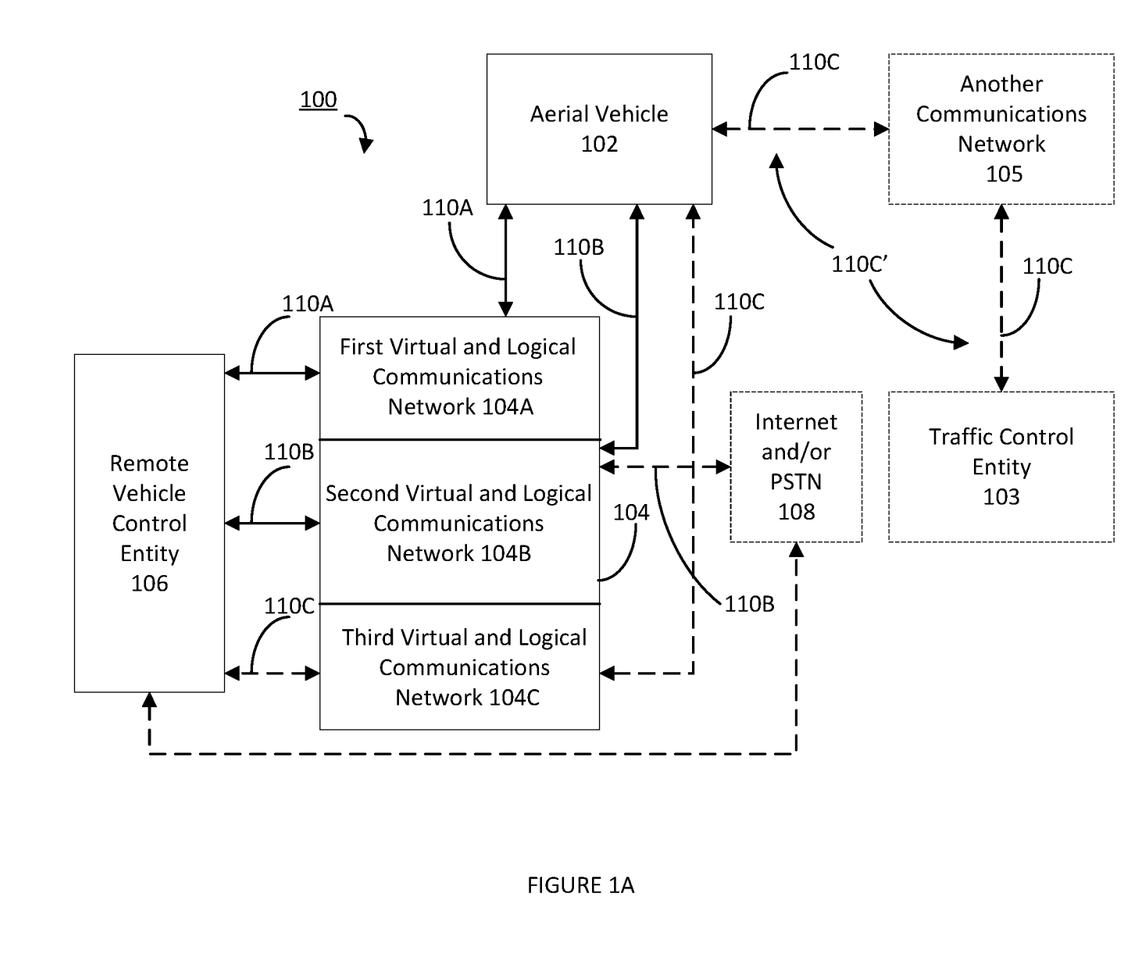
FIG. 1A illustrates a block diagram of a system for communicating with an aerial vehicle.

FIG. 1A illustrates a block diagram of a system 100 for communicating with an aerial vehicle. The system comprises an aerial vehicle 102. A first sub-system of the aerial vehicle 102 is configured to send a first type of data to and to receive the first type of data from a first entity external to the aerial vehicle 102 and through a first virtual and logical communications network 104A. The first sub-system may be on and/or in the aerial vehicle 102.

The first virtual and logical communications network 104A is a virtual and logical communications network operated on a physical communications network 104, e.g., a public cellular network. A virtual and logical communications network may also be referred to as a network slice. The physical communications network may be a physical terrestrial cellular communications network (e.g., a 5G physical terrestrial cellular network or any other type of physical terrestrial cellular network) and/or a satellite communications network configured to implement and operate virtual and logical communications network(s). A satellite communications network comprises one or more satellites orbiting earth and one or more terrestrial ground stations configured to facilitate communications with at least one of the one or more satellites; at least one of the one or more satellites, and thus at least one of the one or more terrestrial ground stations, is configured to communicate with the aerial vehicle 102.

For pedagogical purposes, the first sub-system of the aerial vehicle 102 is subsequently illustrated as command and control avionics (or command and control avionics circuitry); however, the first sub-system may be implemented with another system in the aerial vehicle 102. Command and control avionics may be also more generally referred to as command and control electronic circuitry—which is applicable for aerial and non-aerial vehicles. The command and control avionics is configured to (a) monitor and/or control attitude, speed, and/or heading control mechanism(s), and/or propulsion system(s) and/or other system(s) of the aerial vehicle 102, and/or (b) to determine a path from the aerial vehicle 102 to a waypoint or a destination of the aerial vehicle 102. The first type of data is communicated through a first communications link 110A using a first communications protocol. Optionally, the first type of data is data about or related to (a) command and control of the aerial vehicle including data about aerial vehicle navigation (e.g., aerial vehicle path of travel, aerial vehicle location, and/or waypoint(s)) and/or aerial vehicle state variable(s) (e.g., speed, heading, and/or attitude) (b) status monitoring and/or control of the aerial vehicle propulsion system(s), and/or (c) status monitoring and/or control of other aerial vehicle component(s).

For pedagogical reasons, the first entity is illustrated as a remote vehicle control entity 106, e.g., a remote pilot and/or a remote autopilot; however, the first entity can be other personnel and/or system(s). Data communications between the first entity and the first sub-system, and through the first virtual and logical communications network 104A, is illustrated as being conveyed through the first communications link 110A. Thus, the first communications link 110A comprises the first virtual and logical communications network 104A operated on the physical communications network 104.

A second sub-system of the aerial vehicle 102 is configured to send a second type of data to and to receive a second type of data from the first entity and/or a second entity external to the aerial vehicle 102 and through (a) a second virtual and logical communications network 104B configured to be operated on the physical communications network 104 or (b) the physical communications network 104. The second sub-system may be on and/or in the aerial vehicle 102.

For pedagogical purposes, the second entity is illustrated as the Internet and/or a Public Switched Telephone Network (PSTN)108; however, the second entity can be personnel and/or system(s). Optionally, the second sub-system of the aerial vehicle 102 is a cellular repeater, a small cell (e.g., a pico or femto cell), a wireless local area network (WLAN) (e.g., compliant with the Institute of Electrical and Electronics Engineers (IEEE) 802.11 standard), and/or at least one sensor. The WLAN may be used to provide access to passengers and/or crew of the aerial vehicle 102 to the Internet and/or the PSTN 108, data messaging, and voice over internet protocol (VoIP) communications. The at least one sensor may be camera(s), radar(s), lidar(s), and/or any other sensor(s) used to image region(s) or sense the environment exterior to and/or within the aerial vehicle 102. Optionally, image(s) from the sensor(s) are provided to the remote vehicle control entity 106 to aid the remote vehicle control entity 106 in controlling the aerial vehicle 102, e.g., a path of travel of the aerial vehicle 102.

Data communications between the second entity and the second sub-system, and through the second virtual and logical communications network 104B or the physical communications network 104, is illustrated as being through a second communications link 110B. The first type of data is communicated through a first communications link 110A using a first communications protocol. Optionally, the second type of data is not about or related to aerial vehicle navigation and/or aerial vehicle state variable(s). Optionally, the second type of data is, or is related to, data collected by sensor(s) on and/or in the aerial vehicle 102, and/or data conveyed (through communication system(s)) to and/from passengers of the aerial vehicle 102.

An optional third sub-system, i.e., a radio, of the aerial vehicle 102 is configured to relay a third type of data between the first entity, e.g., the remote vehicle control entity 106, and a traffic control entity through an optional third virtual and logical communications network 104C. The third type of data is also relayed, between the remote vehicle control entity 106 and the traffic control entity 103, through the radio (of the aerial vehicle 102) and optionally through another communications network 105. The third sub-system may be on and/or in the aerial vehicle 102. The radio may also be referred to as an air traffic control (ATC) radio. Optionally, the third type of data is data communicated between a remote vehicle control entity 106 and the traffic control entity 103.

The optional third virtual and logical communications network 104C is operated on the physical communications network 104. The third type of data is configured to be communicated directly between the radio and a traffic control entity 103, or between the radio and the traffic control entity 103 through another communications network 105. Through the radio, of the aerial vehicle 102, and the third virtual and logical communications network 104C, the traffic control entity 103, e.g., an air traffic controller or system, and the remote vehicle control entity 106 are configured to communicate third data between one another, e.g., through the third communications link 110C.

Optionally, the remote vehicle control entity 106 can submit requests, e.g., to the traffic control entity 103. Optionally, the traffic control entity 103 can convey to the remote vehicle control entity 106, instructions, e.g., an authorized path of travel of the aerial vehicle 102 or change(s) to a path of travel of the aerial vehicle 102. Data communications between the remote vehicle control entity 106 and the traffic control entity 103, and through the radio and the third virtual and logical communications network 104C, is illustrated as being through a third communications link 110C.

Optionally, the third data communicated over the third communications link 110C may be speech in analog or digital format or messages in digital format. The third communications link 110C may transport data in analog and/or digital formats. Optionally, the third virtual and logical communications network 104C transports digital data whilst the ATC radio and traffic control entity 103 communicate in either analog or digital format. Optionally, when speech is communicated over the third communications link 110C, the speech may be communicated using a digital format, e.g., voice over internet protocol (VoIP). Third data communicated through a PSTN may be in digital and/or analog format, e.g., depending on where the third data is located in the PSTN.

Optionally, the third type of data is data about or related to requests by the traffic control entity 103 and/or the remote vehicle control entity 106 relating to a path of travel and/or state variables of the aerial vehicle 102; such state variables include vehicle position, attitude, and/or speed. Optionally, the first subsystem sends data to and receives data from the traffic control entity 103 in a third communications protocol through a third virtual and logical communications network 104C of the physical communications network 104.

Optionally, the third communications protocol is different from the first communications protocol and/or the second communications protocol. Optionally, the third communications protocol comprises additional data indicating a particular logical and virtual network, and optionally additional data uniquely associated with the particular logical and virtual network. Optionally, for the third communications protocol, the additional data may relate to the path of travel and/or state variables of the aerial vehicle 102.

Optionally, the first virtual and logical communications network 104A, the second virtual and logical communications network 104B, the third virtual and logical communications network 104C, and the physical communications network each have a different quality of service. Optionally, the first communications link 110A, e.g., the first virtual and logical communications network 104A, has a quality of service including at least one of (a) a latency of less than one second, (b) for data integrity, use of a keyed-hash message authentication code (HMAC) with a message authentication code of at least 64 bits in length that is appended to a message[5], (c) a continuity greater than 99.999%, and (d) an availability of greater than 99.9%.

[5] The message authentication code is generated by applying a key (known to the sender and recipient) and the HMAC function to the message. The message includes a message payload, e.g., data, and a unique sequence number associated with each message payload.

Optionally, the physical communications network 104 has no guaranteed quality of service. Optionally, the second communications link 110B has no guaranteed quality of service. Optionally, the third communications link 110C has a quality of service including a latency of less than 155 milliseconds; thus, the third virtual and logical communications network 104C must have a quality of service equal to the quality of service of the third communications link or with a lower value maximum latency.

The second communications link 110B comprises the second virtual and logical communications network 104B operated on the physical communications network 104, or the physical communications network 104. The third communications link 110C comprises the third virtual and logical communications network 104C operated on the physical communications network 104 and a sub-communications link 110C' communicatively coupling the aerial vehicle 102 (e.g., the ATC radio) with the traffic control entity 103. Optionally, the third communications link 110C further includes the other communications network 105.

Figure 1B:
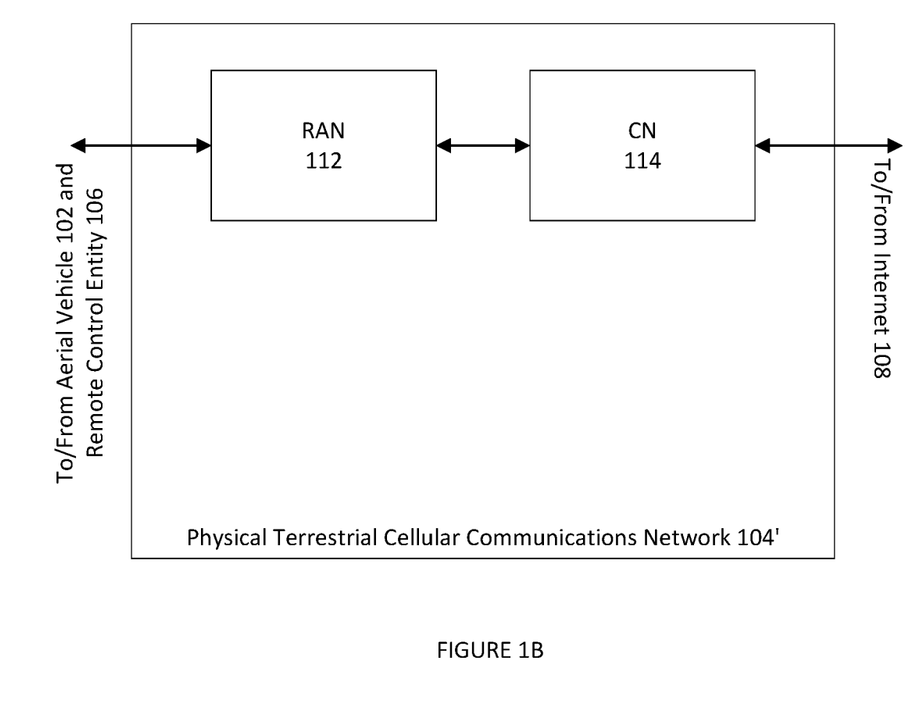
FIG. 1B illustrates a block diagram of one embodiment of a physical communications network configured to implement at least a first virtual and logical communications network.

FIG. 1B illustrates a block diagram of one embodiment of the physical communications network 204 configured to implement at least the first virtual and logical communications network 104A, and optionally the second virtual and logical communications network 104B and/or, the third virtual and logical communications network 104C. The first virtual and logical communications network 104A and the physical communications network 104 each have different quality of services. Optionally, the second virtual and logical communications network 104B has a quality of service that is different than the default quality of service of the physical communications network 104. The optional third virtual and logical communications network 104C has a quality of service that is different than the default quality of service of the physical communications network 104.

A physical terrestrial cellular communications network 104' comprises a physical radio access network (RAN) 112 communicatively coupled to a physical core network (CN) 114. The RAN 112 comprises at least one base station used to wirelessly communicate with device(s) and/or system(s), e.g., the aerial vehicle 102. The physical core network 114 is configured to perform functions such as user authentication, service authorization, security activation, internet protocol (IP) address allocation, and set up of links to transfer user traffic, e.g., data, voice, and/or video. The physical core network 114 is configured to be communicatively coupled to the Internet and/or PSTN 108. Optionally, the remote vehicle control entity 106 is configured to communicate, through the physical communications network 204, through the Internet and/or PSTN 108 and/or through the physical RAN 112.

Figure 2:
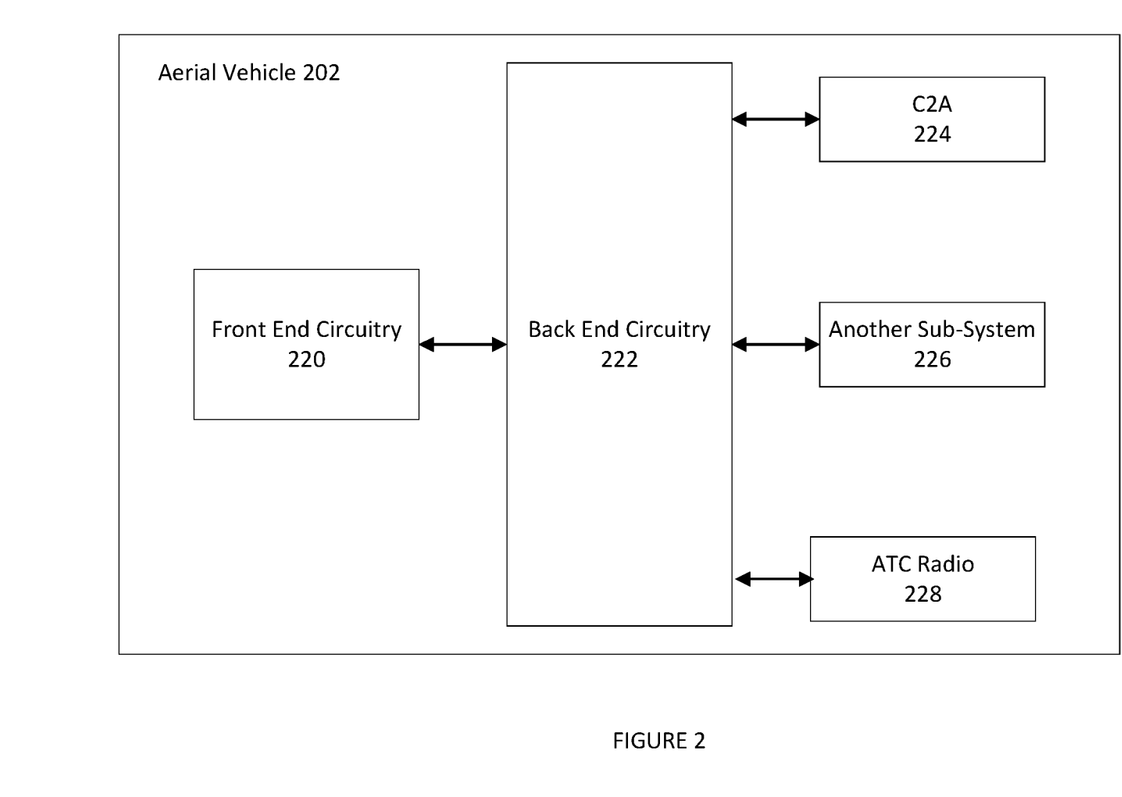
FIG. 2 illustrates a block diagram of one embodiment of an aerial vehicle configured to communicate with at least one virtual and logical communications network.

FIG. 2 illustrates a block diagram of one embodiment of an aerial vehicle 202 configured to communicate with at least one virtual and logical communications network. The illustrated aerial vehicle 202 comprises front end circuitry 220, back end circuitry 222, command and control avionics (or command and control avionics circuitry or C2A) 224, and another sub-system 226. Optionally, the front end circuitry 220 comprises at least one antenna. The first sub-system described above with regards to FIG. 1A may be optionally implemented by the command and control avionics 224. The second sub-system described above with regards to FIG. 1A may be optionally implemented by the other sub-system 226.

The command and control avionics 224 is configured to control aerial vehicle navigation and/or state variable(s) and/or provide status data about, and/or receive data for controlling, component(s); such component(s) which may be controlled by the received data may be components related to controlling aerial vehicle navigation and/or state variable(s). Aerial vehicle navigation and state variables are exemplified elsewhere herein. Such data may be provided to or used to control the propulsion system(s), control surfaces, and/or other component(s)) of the aerial vehicle 202. Optionally, such data may be provided to and/or from the remote vehicle control entity 106. Status data means information about a condition of one or more parameters. Controlling travel of the aerial vehicle 202 means controlling the state variable(s) (e.g., attitude, heading, and/or speed of the aerial vehicle) and/or plan and/or direct navigation (e.g., a route of travel) of the aerial vehicle 202.

Planning the route of travel of the aerial vehicle means planning all or part of a travel path of the aerial vehicle between an origin point and a destination point and optionally through one or more way points, or between the current location of the aerial vehicle and the destination point and optionally through one or more way points. Directing a route of travel of the aerial vehicle means determining aerial vehicle state variable(s) (e.g., attitude, heading, and/or speed of the aerial vehicle 202) so that the aerial vehicle 202 maintains its path of travel.

Optionally, status data may comprise at least one of: true airspeed of the aerial vehicle 202, barometric altitude, status of a flight guidance system (FGS) and/or the FGS's mode of operation, status of electrical power generation and/or electrical power distribution, fire and/or smoke detection information, aircraft lighting status, deicing system status, status of control surface(s) (e.g., flaps and speed brakes), status of retractable landing gear, and nose wheel angle.

Optionally, the aerial vehicle 202 includes an air traffic control (ATC) radio (or radio) 228. The radio 228 is configured to convey third data between the traffic control entity 103 and the remote vehicle control entity 106. The optional radio described above with regards to FIG. 1A is illustrated in FIG. 2 by the optional radio 228.

The front end circuitry 220 is electrically coupled to the back end circuitry 222. The front end circuitry 220 is configured to translate (e.g., up convert and/or down convert) a frequency band of at least one signal between a higher frequency band and a lower frequency band. Optionally, each signal—depending upon which communication link is being communicated over—comprises one of the first type of data, the second type of data, and the third type of data. The back end circuitry 222 is configured to at least one of (a) demodulate data and (b) decode data, wherein data comprises at least one of first data and second data. Optionally, the data comprises at least one of the first type of data, the second type of data, and the third type of data.

Figure 3:
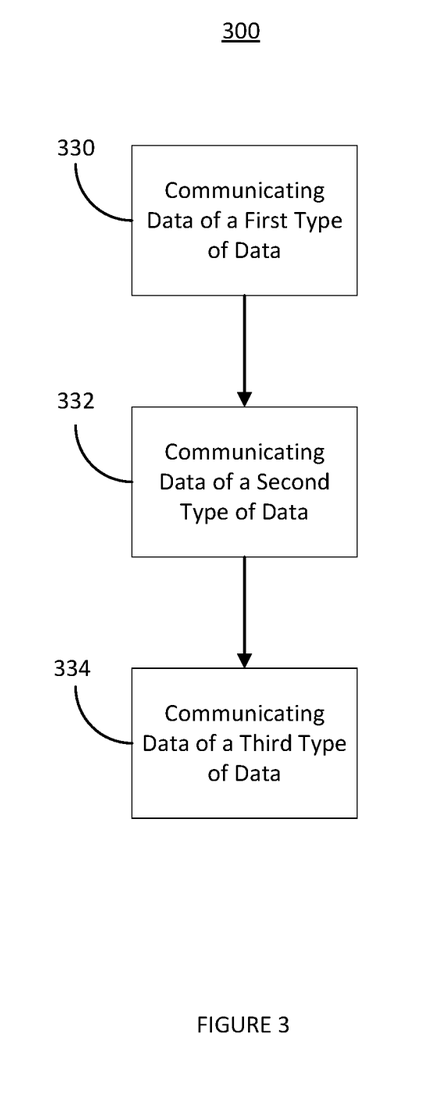
FIG. 3 illustrates a flow diagram of one embodiment of a method of communicating with an aerial vehicle through at least one virtual and logical communications network.

FIG. 3 illustrates a flow diagram of one embodiment of a method 300 of communicating with an aerial vehicle through at least one virtual and logical communications network. To the extent that the method shown in FIG. 3 is described herein as being implemented in the systems illustrated in FIGS. 1A-2, it is to be understood that other embodiments can be implemented in other ways. The blocks of the flow diagrams have been arranged in a generally sequential manner for ease of explanation; however, it is to be understood that this arrangement is merely exemplary, and it should be recognized that the processing associated with the methods (and the blocks shown in the Figures) can occur in a different order (for example, where at least some of the processing associated with the blocks is performed in parallel and/or in an event-driven manner).

In block 330, data of a first type of data is communicated using a first communications protocol between command and control avionics 224 of an aerial vehicle 102 and a first virtual and logical communications network operated on a physical communications network 104 of a first communications link 110A. Optionally, the data of the first type of data is communicated, through the first virtual and logical communications network, between the command and control avionics 224 and a remote vehicle control entity 106. Optionally, the first communications link 110A has a quality of service including at least one of (a) a latency of less than one second, (b) for data integrity, use of a keyed-hash message authentication code (HMAC) with a message authentication code of at least 64 bits in length that is appended to a message, (c) a continuity of >99.999%, and (d) an availability of greater than 99.9%; thus, the first virtual and logical communications network 104A must have a quality of service to facilitate a quality of service of the first communications link 110A required by system(s) which communicate through the first communications link 110A. The first communications link 110A communicatively couples the remote vehicle control entity 106 and the command and control avionics 224 of the aerial vehicle 102 through the first virtual and logical communications network 104A.

In block 332, data of a second type of data is communicated in a second communications protocol between another sub-system 226 of the aerial vehicle 102, and a second virtual and logical communications network 104B operated on the physical communications network 104 or the physical communications network 104. Optionally, the first virtual and logical communications network 104A has at least one of lower latency, lower packet loss, higher certainty of data integrity, higher continuity, higher availability, and higher level of confidentiality than the physical communications network or another, e.g., a second, virtual and logical communications network operated on the physical communications network. Optionally, the physical communications network 104 has no guaranteed quality of service.

In optional block 334, data of a third type of data is communicated, e.g., relayed, between the first entity, i.e., the remote vehicle control entity 106, and a traffic control entity 103, and through an optional third virtual and logical communications network 104C, of an optional third communications link 110C, and a radio 228 of the aerial vehicle 102. Optionally, the third communications link 110C has a quality of service including a latency of less than 155 milliseconds; thus, the optional third virtual and logical communications network 104C must have a quality of service which facilitates the quality of service of the third communications link.

The processor circuitry described herein may include one or more microprocessors, microcontrollers, digital signal processing (DSP) elements, application-specific integrated circuits (ASICs), and/or field programmable gate arrays (FPGAs). In this exemplary embodiment, processor circuitry includes or functions with software programs, firmware, or other computer readable instructions for carrying out various process tasks, calculations, and control functions, used in the methods described herein. These instructions are typically tangibly embodied on any storage media (or computer readable medium) used for storage of computer readable instructions or data structures.

The memory circuitry described herein can be implemented with any available storage media (or computer readable medium) that can be accessed by a general purpose or special purpose computer or processor, or any programmable logic device. Suitable computer readable medium may include storage or memory media such as semiconductor, magnetic, and/or optical media. For example, computer readable media may include conventional hard disks, Compact Disk-Read Only Memory (CD-ROM), DVDs, volatile or non-volatile media such as Random Access Memory (RAM) (including, but not limited to, Dynamic Random Access Memory (DRAM)), Read Only Memory (ROM), Electrically Erasable Programmable ROM (EEPROM), and/or flash memory. Combinations of the above are also included within the scope of computer readable media.

Methods of the invention can be implemented in computer readable instructions, such as program modules or applications, which may be stored in the computer readable medium that is part of (optionally the memory circuitry) or communicatively coupled to the processing circuitry, and executed by the processing circuitry, optionally the processor circuitry. Generally, program modules or applications include routines, programs, objects, data components, data structures, algorithms, and the like, which perform particular tasks or implement particular abstract data types.

Databases as used herein may be either conventional databases or data storage formats of any type, e.g., data files. Although separate databases are recited herein, one or more of such databases may be combined.

In various alternative embodiments, system elements, method steps, or examples described throughout this disclosure may be implemented on one or more computer systems, field programmable gate array (FPGA), or similar devices comprising a processor executing code to realize those elements, processes, or examples, said code stored on a non-transient data storage device. Therefore, other embodiments of the present disclosure may include elements comprising program instructions resident on computer readable media which when implemented by such computer systems, enable them to implement the embodiments described herein. As used herein, the term "computer readable media" refers to tangible memory storage devices having non-transient physical forms. Such non-transient physical forms may include computer memory devices, such as but not limited to magnetic disk or tape, any optical data storage system, flash read only memory (ROM), non-volatile ROM, programmable ROM (PROM), erasable-programmable ROM (E-PROM), random access memory (RAM), or any other form of permanent, semi-permanent, or temporary memory storage system or device having a physical, tangible form. Program instructions include, but are not limited to computer-executable instructions executed by computer system processors and hardware description languages such as Very High Speed Integrated Circuit (VHSIC) Hardware Description Language (VHDL).

Exemplary Embodiments

Example 1 includes a method for communicating with a vehicle comprising command and control electronic circuitry and at least one other system, the method comprising: communicating data of a first type of data in a first communications protocol between the command and control electronic circuitry, configured to at least one of: control navigation of the vehicle, control at least one state variable of the vehicle, provide data about status of at least one component of the vehicle, and receive data for controlling the at least one component of the vehicle, and a first virtual and logical communications network operated on a physical communications network, wherein the physical communications network comprises at least one of: a physical cellular communications network and a physical satellite communications network; and communicating data of a second type of data in a second communications protocol between the at least one other system of the vehicle, and a second virtual and logical communications network operated on the physical communications network or on the physical communications network.

Example 2 includes the method of Example 1, wherein the first virtual and logical communications network has at least one of a lower latency, a lower packet loss, a higher certainty of data integrity, a higher continuity, a higher availability, and a higher level of confidentiality than the physical communications network when the physical communications network uses its' default quality of service.

Example 3 includes the method of any of Examples 1-2, further comprising communicating data of a third type of data between a third virtual and logical communications network operated on the physical communications network and a traffic control radio on the vehicle and configured to communicate the data of the third type of data between a traffic control entity and a remote vehicle control entity.

Example 4 includes the method of Example 3, wherein a communications link, including the traffic control radio and the third virtual and logical communications network and formed between the remote vehicle control entity and the traffic control entity, has a latency less than a latency of the first virtual and logical communications network operated on the physical communications network.

Example 5 includes the method of Example 4, wherein the latency of the communications link, including the traffic control radio and the second virtual and logical communications network and formed between the remote vehicle control entity and the traffic control entity, is less than 155 milliseconds.

Example 6 includes the method of any of Examples 1-5, wherein the first virtual and logical communications network, has a quality of service including at least one of (a) a latency of less than one second, (b) for data integrity, use of a keyed-hash message authentication code with a message authentication code of at least 64 bits in length that is appended to a message, (c) a continuity greater than 99.999%, and (d) an availability of greater than 99.9%, wherein continuity means $$\frac{\text{Number of Transactions Completed within } a \text{ Transaction Expiration Time}(TET)}{\text{Number of All Initiated Transactions}},$$

wherein the TET means a maximum time, defined by an operational requirement, to complete a transaction provided that a corresponding communications link over which the transaction is sent was available at commencement of the transaction, wherein transaction means sending data from a transmitter through a communications link and receiving all of the sent data at a receiver.

Example 7 includes the method of any of Examples 1-6, wherein the data of the second type of data in the second communications protocol is configured to be sent from the at least one other system, of the vehicle, comprising at least one of: a cellular repeater, a small cell, a wireless local area network, and at least one sensor.

Example 8 includes the method of any of Examples 1-7, wherein the first type of data comprises data about at least one of: the navigation of the vehicle, the at least one state variable of the vehicle, attitude of the vehicle, heading of the vehicle, a propulsion system of the vehicle, control of at least one system of the vehicle, and the status of the at least one system of the vehicle.

Example 9 includes a communications network, comprising: a first virtual and logical communications network configured to communicate data of a first type of data in a first communications protocol with command and control electronic circuitry, of a vehicle, configured to at least one of: control navigation of the vehicle, control at least one state variable of the vehicle, provide data about status of at least one component of the vehicle, and receive data for controlling the at least one component of the vehicle; a physical communications network or a second virtual and logical communications network configured to communicate data of a second type of data in a second communications protocol with at least one other system of the vehicle, wherein the physical communications network comprises at least one of: a physical cellular communications network and a physical satellite communications network; and wherein each of the first virtual and logical communications network and the second virtual and logical communications network is operated on the physical communications network; wherein the physical communications network comprises a radio access network and a core network.

Example 10 includes the communications network of Example 9, wherein the first virtual and logical communications network has at least one of a lower latency, a lower packet loss, a higher certainty of data integrity, a higher continuity, a higher availability, and a higher level of confidentiality than the physical communications network when the physical communications network uses its' default quality of service.

Example 11 includes the communications network of any of Examples 9-10, further comprising a third virtual and logical communications network operated on the physical communications network and configured to communicate data of a third type of data between the third virtual and logical communications network and a traffic control radio on the vehicle and configured to communicate the data of the third type of data between a traffic control entity and a remote vehicle control entity.

Example 12 includes the communications network of Example 11, wherein a communications link, including the traffic control radio and the third virtual and logical communications network and formed between the remote vehicle control entity and the traffic control entity, has a latency less than a latency of the first virtual and logical communications network operated on the physical communications network.

Example 13 includes the communications network of any of Examples 9-12, wherein the first virtual and logical communications network, has a quality of service including at least one of (a) a latency of less than one second, (b) for data integrity, use of a keyed-hash message authentication code with a message authentication code of at least 64 bits in length that is appended to a message, (c) a continuity greater than 99.999%, and (d) an availability of greater than 99.9%, wherein continuity means $$\frac{\text{Number of Transactions Completed within } a \text{ Transaction Expiration Time}(TET)}{\text{Number of All Initiated Transactions}},$$

wherein the TET means a maximum time, defined by an operational requirement, to complete a transaction provided that a corresponding communications link over which the transaction is sent was available at commencement of the transaction, wherein transaction means sending data from a transmitter through a communications link and receiving all of the sent data at a receiver.

Example 14 includes the communications network of any of Examples 9-13, wherein the first type of data comprises data about at least one of: the navigation of the vehicle, the at least one state variable of the vehicle, attitude of the vehicle, heading of the vehicle, a propulsion system of the vehicle, control of at least one system of the vehicle, and the status of the at least one system of the vehicle.

Example 15 includes a system configured to be mounted in a vehicle comprising (a) command and control electronic circuitry, configured to at least one of: control travel of the vehicle and provide data about status of at least one component of the vehicle, and (b) at least one other system, the system comprises: front end circuitry configured to translate a frequency band of first and second data between a higher band and a lower band; backend circuitry, communicatively coupled to the front end circuitry, configured to at least one of demodulate and decode data received from the front end circuitry, and at least one of modulate and code data provided to the front end circuitry; wherein the backend circuitry is configured to be communicatively coupled to the command and control electronic circuitry and the at least one other system of the vehicle; and wherein the front end circuitry and the backend circuitry are further configured to communicate data of a first data type in a first communications protocol between the command and control electronic circuitry and a first virtual and logical communications network operated on a physical communications network, wherein the physical communications network comprises at least one of: a physical cellular communications network and a physical satellite communications network; wherein the front end circuitry and the backend circuitry are further configured to communicate data of a second data type in a second communications protocol between the at least one other system, and a second virtual and logical operated on the physical communications network or the physical communications network.

Example 16 includes the system of Example 15, wherein the first virtual and logical communications network has at least one of a lower latency, a lower packet loss, a higher certainty of data integrity, a higher continuity, a higher availability, and a higher level of confidentiality than the physical communications network when the physical communications network uses its' default quality of service.

Example 17 includes the system of any of Examples 15-16, wherein the front end circuitry and the backend circuitry are further configured to communicate data of a third type of data between a third virtual and logical communications network and a traffic control radio on the vehicle and configured to communicate the data of the third type of data between a traffic control entity and a remote vehicle control entity.

Example 18 includes the system of Example 17, wherein a communications link, including the traffic control radio and the third virtual and logical communications network and formed between the remote vehicle control entity and the traffic control entity, has a latency less than a latency of the first virtual and logical communications network operated on the physical communications network.

Example 19 includes the system of any of Examples 15-18, wherein the first virtual and logical communications network, has a quality of service including at least one of (a) a latency of less than one second, (b) for data integrity, use of a keyed-hash message authentication code with a message authentication code of at least 64 bits in length that is appended to a message, (c) a continuity greater than 99.999%, and (d) an availability of greater than 99.9%, wherein continuity means $$\frac{\text{Number of Transactions Completed within } a \text{ Transaction Expiration Time}(TET)}{\text{Number of All Initiated Transactions}},$$

wherein the TET means a maximum time, defined by an operational requirement, to complete a transaction provided that a corresponding communications link over which the transaction is sent was available at commencement of the transaction, wherein transaction means sending data from a transmitter through a communications link and receiving all of the sent data at a receiver.

Example 20 includes the system of any of Examples 15-19, wherein the data of the second data type in the second communications protocol is configured to be sent from the at least one other system, of the vehicle, comprising at least one of: a cellular repeater, a small cell, a wireless local area network, and at least one sensor.

Although specific embodiments have been illustrated and described herein, it will be appreciated by those of ordinary skill in the art that any arrangement, which is calculated to achieve the same purpose, may be substituted for the specific embodiment shown. This application is intended to cover any adaptations or variations of the present invention. Therefore, it is manifestly intended that this invention be limited only by the claims and the equivalents thereof.

What is claimed is:

1. A method for communicating with a vehicle comprising command and control electronic circuitry and at least one other system, the method comprising:
   communicating data of a first type of data in a first communications protocol between the command and control electronic circuitry, configured to at least one of: control navigation of the vehicle, control at least one state variable of the vehicle, provide data about status of at least one component of the vehicle, and receive data for controlling the at least one component of the vehicle, and a first virtual and logical communications network operated on a physical communications network, wherein the physical communications network comprises at least one of: a physical cellular communications network and a physical satellite communications network;

communicating data of a second type of data in a second communications protocol between the at least one other system of the vehicle, and a second virtual and logical communications network operated on the physical communications network or through the physical communications network; and communicating data of a third type of data between a third virtual and logical communications network, operated on the physical communications network, and a traffic control radio on the vehicle and configured to communicate the data of the third type of data between a traffic control entity and a remote vehicle control entity.

2. The method of claim 1, wherein the first virtual and logical communications network has at least one of a lower latency, a lower packet loss, a higher certainty of data integrity, a higher continuity, a higher availability, and a higher level of confidentiality than the physical communications network when the physical communications network uses its' default quality of service.

3. The method of claim 1, wherein a communications link, including the traffic control radio and the third virtual and logical communications network and formed between the remote vehicle control entity and the traffic control entity, has a latency less than a latency of the first virtual and logical communications network operated on the physical communications network.

4. The method of claim 3, wherein the latency of the communications link, including the traffic control radio and the third virtual and logical communications network and formed between the remote vehicle control entity and the traffic control entity, is less than 155 milliseconds.

5. The method of claim 1, wherein the first virtual and logical communications network, has a quality of service including at least one of (a) a latency of less than one second, (b) for data integrity, use of a keyed-hash message authentication code with a message authentication code of at least 64 bits in length that is appended to a message, (c) a continuity greater than 99.999%, and (d) an availability of greater than 99.9%, wherein continuity means $$\frac{\text{Number of Transactions Completed within a Transaction Expiration Time}(TET)}{\text{Number of All Initiated Transactions}},$$

wherein the TET means a maximum time, defined by an operational requirement, to complete a transaction provided that a corresponding communications link over which the transaction is sent was available at commencement of the transaction, wherein transaction means sending data from a transmitter through a communications link and receiving all of the sent data at a receiver.

6. The method of claim 1, wherein the data of the second type of data in the second communications protocol is configured to be sent from the at least one other system, of the vehicle, comprising at least one of: a cellular repeater, a small cell, a wireless local area network, and at least one sensor.

7. The method of claim 1, wherein the first type of data comprises data about at least one of: the navigation of the vehicle, the at least one state variable of the vehicle, attitude of the vehicle, heading of the vehicle, a propulsion system of the vehicle, control of at least one system of the vehicle, and the status of the at least one system of the vehicle.

8. A communications network, comprising:

a first virtual and logical communications network configured to communicate data of a first type of data in a first communications protocol with command and control electronic circuitry, of a vehicle, configured to at least one of: control navigation of the vehicle, control at least one state variable of the vehicle, provide data about status of at least one component of the vehicle, and receive data for controlling the at least one component of the vehicle;

a physical communications network or a second virtual and logical communications network configured to communicate data of a second type of data in a second communications protocol with at least one other system of the vehicle, wherein the physical communications network comprises at least one of: a physical cellular communications network and a physical satellite communications network; and a third virtual and logical communications network configured to communicate data of a third type of data between the third virtual and logical communications network and a traffic control radio on the vehicle and configured to communicate the data of the third type of data between a traffic control entity and a remote vehicle control entity;

wherein each of the first virtual and logical communications network, the second virtual and logical communications network, and the third virtual and logical communications network is operated on the physical communications network.

9. The communications network of claim 8, wherein the first virtual and logical communications network has at least one of a lower latency, a lower packet loss, a higher certainty of data integrity, a higher continuity, a higher availability, and a higher level of confidentiality than the physical communications network when the physical communications network uses its' default quality of service.

10. The communications network of claim 8, wherein a communications link, including the traffic control radio and the third virtual and logical communications network and formed between the remote vehicle control entity and the traffic control entity, has a latency less than a latency of the first virtual and logical communications network operated on the physical communications network.

11. The communications network of claim 8, wherein the first virtual and logical communications network, has a quality of service including at least one of (a) a latency of less than one second, (b) for data integrity, use of a keyed-hash message authentication code with a message authentication code of at least 64 bits in length that is appended to a message, (c) a continuity greater than 99.999%, and (d) an availability of greater than 99.9%, wherein continuity means $$\frac{\text{Number of Transactions Completed within a Transaction Expiration Time}(TET)}{\text{Number of All Initiated Transactions}},$$

wherein the TET means a maximum time, defined by an operational requirement, to complete a transaction provided that a corresponding communications link over which the transaction is sent was available at commencement of the transaction, wherein transaction means sending data from a transmitter through a communications link and receiving all of the sent data at a receiver.

12. The communications network of claim 8, wherein the first type of data comprises data about at least one of: the navigation of the vehicle, the at least one state variable of the vehicle, attitude of the vehicle, heading of the vehicle, a propulsion system of the vehicle, control of at least one system of the vehicle, and the status of the at least one system of the vehicle.

13. A system configured to be mounted in a vehicle comprising (a) command and control electronic circuitry, configured to at least one of: control travel of the vehicle and provide data about status of at least one component of the vehicle, and (b) at least one other system, the system comprises:
 front end circuitry configured to translate a frequency band of first and second data between a higher band and a lower band;
 backend circuitry, communicatively coupled to the front end circuitry, configured to at least one of demodulate and decode data received from the front end circuitry, and at least one of modulate and code data provided to the front end circuitry;
 wherein the backend circuitry is configured to be communicatively coupled to the command and control electronic circuitry and the at least one other system of the vehicle; and
 wherein the front end circuitry and the backend circuitry are further configured to communicate data of a first data type in a first communications protocol between the command and control electronic circuitry and a first virtual and logical communications network operated on a physical communications network, wherein the physical communications network comprises at least one of: a physical cellular communications network and a physical satellite communications network;
 wherein the front end circuitry and the backend circuitry are further configured to communicate data of a second data type in a second communications protocol between the at least one other system, and a second virtual and logical operated on the physical communications network or the physical communications network;
 wherein the front end circuitry and the backend circuitry are further configured to communicate data of a third type of data between a third virtual and logical communications network and a traffic control radio on the vehicle and configured to communicate the data of the third type of data between a traffic control entity and a remote vehicle control entity.

14. The system of claim 13, wherein the first virtual and logical communications network has at least one of a lower latency, a lower packet loss, a higher certainty of data integrity, a higher continuity, a higher availability, and a higher level of confidentiality than the physical communications network when the physical communications network uses its' default quality of service.

15. The system of claim 13, wherein a communications link, including the traffic control radio and the third virtual and logical communications network and formed between the remote vehicle control entity and the traffic control entity, has a latency less than a latency of the first virtual and logical communications network operated on the physical communications network.

16. The system of claim 13, wherein the first virtual and logical communications network, has a quality of service including at least one of (a) a latency of less than one second, (b) for data integrity, use of a keyed-hash message authentication code with a message authentication code of at least 64 bits in length that is appended to a message, (c) a continuity greater than 99.999%, and (d) an availability 99.999%, and (d) an availability of greater than 99.9%, wherein continuity means $$\frac{\text{Number of Transactions Completed within a Transaction Expiration Time}(TET)}{\text{Number of All Initiated Transactions}},$$

wherein the TET means a maximum time, defined by an operational requirement, to complete a transaction provided that a corresponding communications link over which the transaction is sent was available at commencement of the transaction, wherein transaction means sending data from a transmitter through a communications link and receiving all of the sent data at a receiver.

17. The system of claim 13, wherein the data of the second data type in the second communications protocol is configured to be sent from the at least one other system, of the vehicle, comprising at least one of: a cellular repeater, a small cell, a wireless local area network, and at least one sensor.

* * * * *